US012753368B2

(12) United States Patent
Manassra et al.

(10) Patent No.: US 12,753,368 B2
(45) **Date of Patent: *Oct. 6, 2026**

(54) CLEANING COMPOSITIONS CONTAINING GUM AND METHODS OF USE THEREWITH

(71) Applicant: Harris Research, Inc., Nashville, TN (US)

(72) Inventors: Adnan Rashid Manassra, Logan, UT (US); Christopher Wayne Smith, Logan, UT (US)

(73) Assignee: Harris Research, Inc., Nashville, TN (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/959,519

(22) Filed: Oct. 4, 2022

(65) Prior Publication Data

US 2023/0040704 A1 Feb. 9, 2023

Related U.S. Application Data

(63) Continuation of application No. 17/020,924, filed on Sep. 15, 2020, now Pat. No. 11,459,529.

(60) Provisional application No. 62/901,163, filed on Sep. 16, 2019.

(51) Int. Cl.

| | |
|---|---|
| ***C11D 3/22*** | (2006.01) |
| ***C11D 3/00*** | (2006.01) |
| ***C11D 3/10*** | (2006.01) |
| ***C11D 3/12*** | (2006.01) |
| ***C11D 3/20*** | (2006.01) |
| ***C11D 7/08*** | (2006.01) |
| ***C11D 7/12*** | (2006.01) |
| ***C11D 7/26*** | (2006.01) |
| ***C11D 17/00*** | (2006.01) |
| ***C11D 17/06*** | (2006.01) |

(52) U.S. Cl.
CPC ................ *C11D 3/222* (2013.01); *C11D 3/10* (2013.01); *C11D 3/122* (2013.01); *C11D 3/2082* (2013.01); *C11D 3/2086* (2013.01); *C11D 17/0008* (2013.01); *C11D 17/06* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 4,534,876 | A | 8/1985 | Browne | |
| 4,576,727 | A * | 3/1986 | Browne | C11D 3/046 510/318 |
| 4,753,792 | A | 6/1988 | Aberg | |
| 4,786,439 | A * | 11/1988 | Ploog | D06M 13/148 510/516 |
| 5,783,537 | A | 7/1998 | Ahmed et al. | |
| 10,774,290 | B2 | 9/2020 | Caparros Casco | |
| 11,191,264 | B2 | 12/2021 | Anderson et al. | |
| 11,377,626 | B2 | 7/2022 | Olson et al. | |
| 11,459,529 | B2 * | 10/2022 | Manassra | C11D 3/3942 |
| 2006/0005316 | A1 | 1/2006 | Durrant | |
| 2008/0003194 | A1 | 1/2008 | Rebrovic | |
| 2008/0287331 | A1 | 11/2008 | Lin et al. | |
| 2010/0115708 | A1 | 5/2010 | Caswell et al. | |
| 2011/0009307 | A1 | 1/2011 | Brooker et al. | |
| 2015/0084224 | A1 | 3/2015 | Stolte et al. | |
| 2017/0320764 | A1 * | 11/2017 | De Boer | C11D 3/0052 |
| 2018/0105766 | A1 * | 4/2018 | Caparrós Casco | C11D 17/0073 |
| 2018/0110702 | A1 | 4/2018 | Constantine et al. | |
| 2019/0169777 | A1 * | 6/2019 | Zerhusen | C11D 17/06 |

FOREIGN PATENT DOCUMENTS

| | | |
|---|---|---|
| WO | 1995007973 | 3/1995 |
| WO | 2006079416 | 8/2006 |
| WO | 2015031418 | 3/2015 |

OTHER PUBLICATIONS

Wikipedia, "Tetrasodium EDTA", Dec. 19, 2018, retrieved on Jan. 5, 2021 from https://en.wikipedia.org/w/index.php?title=Tetrasodium_EDTA&oldid=874399630; entire document.
International Search Report dated Feb. 4, 2021 of corresponding International Patent Application No. PCT/US20/50860.

* cited by examiner

*Primary Examiner* — Lorna M Douyon
(74) *Attorney, Agent, or Firm* — Husch Blackwell LLP; Timothy L. Capria; Alexandra C. Lynn

(57) ABSTRACT

The disclosure provides cleaning compositions including at least one acid, at least one carbonate salt, at least one gum, at least one acid salt, and, optionally, at least one chelating agent. When exposed to an aqueous medium, the cleaning compositions may produce carbon dioxide. These cleaning compositions find use, for example, in cleaning textile fibers, such as carpets, drapery, upholstery, and the like. The disclosure provides methods of cleaning soiled textile fibers with a cleaning composition including gum arabic, at least one acid, and at least one carbonate salt.

20 Claims, 2 Drawing Sheets

CLEANING COMPOSITIONS CONTAINING GUM AND METHODS OF USE THEREWITH

CROSS REFERENCE TO RELATED APPLICATION

This application is a continuation of U.S. patent application Ser. No. 17/020,924, filed Sep. 15, 2020, now U.S. Pat. No. 11,459,529, which claims the benefit of and priority to U.S. Provisional Patent Application No. 62/901,163, filed on Sep. 16, 2019, and entitled "Cleaning Compositions Containing Gum and Methods of Use Therewith," the disclosures of which is expressly incorporated by reference in its entirety.

BACKGROUND

A. Field of the Disclosure

The present disclosure relates generally to cleaning compositions containing gum and methods of use thereof. More particularly, this disclosure relates to cleaning compositions comprising at least one acid, at least one carbonate salt, at least one gum, at least one acid salt, and, optionally, at least one chelating agent. When contacted with an aqueous medium, the cleaning compositions may produce carbon dioxide. These cleaning compositions find use, for example, in cleaning textile fibers.

B. Background

Compositions for cleaning textile fibers, such as those found in carpets, upholstery, drapery, clothing, bedding, linens, and the like, generally aim to dislodge and free soil from textile fibers. The dislodged soil may be solubilized or suspended in such a manner that it can be easily removed from the textile fibers, thereby leaving behind fresh, unsoiled fibers. However, this dislodgment and removal of soils are complicated by the fact that textile fibers are often soiled by various, or multiple, types of soiling agents (e.g., oil-based soiling, water-based soiling, etc.).

The vast majority of commercial cleaning compositions make use of "surfactants," which are more commonly known as soaps or detergents. While surfactants are effective to dislodge soil from, and thereby clean, textile fibers, the use of surfactants is associated with several unwanted effects.

For example, the use of surfactants on textile fibers may have deleterious effects. Specifically, in order to remove surfactants from textile fibers, it is generally necessary to apply a large quantity of water to the fibers. As a result, the use of surfactants requires long drying times, which increases the fibers' susceptibility to growing and harboring mildew and results in an undesirable odor. Additionally, surfactants often leave behind oil-based residue on the textile fibers. The inherently oily nature of the surfactants has a propensity for attracting soils, thereby causing premature re-soiling, even where only minute residue is left behind.

Relatedly, surfactant use is associated with a condition commonly known as "brown out." The textile fibers experience "brown out" from surfactant residues left behind in the textile fibers and long drying times. The textile fibers take on a dull look, sometimes turning brown or gray as the surfactant residue discolors and attracts additional dirt that further soils the fibers. Because of the concentrated nature of the surfactant residues remaining in the fibers, these dull, graying effects can be extremely difficult to remedy.

Finally, surfactant use may have negative human health, and pet health, and environmental impacts. As stated above, surfactant use creates an environment that increases the susceptibility of mold or mildew growth. Mold or mildew growth may have serious health consequences for any humans or pets that are exposed to the spores, especially in mold or mildew sensitive populations. Further, many individuals are sensitive to surfactants, such that exposure to surfactants may cause allergic reactions and skin, membrane, or eye irritation. Lastly, many surfactants are not biodegradable and contain excessive amounts of phosphates. Thus, surfactant use may have undesirable environmental consequences.

Accordingly, there is a clear need for a naturally derived, surfactant-free cleaning composition that effectively removes oil and soil particles from textile fibers without requiring a large quantity of water. Further, so as to prevent re-soiling, the cleaning compositions should not leave behind an oily residue on the textile fibers.

BRIEF SUMMARY

The disclosure provides cleaning compositions and formulas. These compositions and formulas find use, for example, in treating or cleaning fiber textiles, such as carpets, upholstery, drapery, and the like.

In a first aspect, a cleaning composition is disclosed. The cleaning composition comprises at least one carbonate salt, at least one acid, at least one gum, at least one acid salt, and, optionally, at least one chelating agent. The cleaning composition may be provided in a solid granular form. In some embodiments, the cleaning composition is free or substantially free of a surfactant. In this aspect, the cleaning composition includes less than 0.5% surfactant. In one embodiment, the cleaning composition includes less than 0.1% surfactant. In another embodiment, the cleaning composition includes no surfactant.

The carbonate salt may be present in an amount of from 10% to 70%, from 25% to 55%, from 35% to 45%, or any subrange or subvalue thereof, of the cleaning composition by weight. The carbonate salt may include sodium carbonate, sodium percarbonate, sodium bicarbonate, lithium carbonate, lithium percarbonate, lithium bicarbonate, potassium carbonate, potassium percarbonate, potassium bicarbonate, ammonium carbonate, sodium sesquicarbonate, potassium sesquicarbonate, ammonium bicarbonate, or a combination thereof. For example, in some embodiments, the carbonate salt comprises sodium carbonate in an amount of from 0% to 100% of the carbonate salt by weight and potassium bicarbonate in an amount of from 0% to 100% of the carbonate salt by weight.

The acid may be present in the cleaning composition in an amount of from 10% to 70%, from 25% to 50%, from 30% to 40%, or any subrange or subvalue thereof, of the cleaning composition by weight. The at least one acid may include an acid having a solubility of approximately 2 grams of the acid per 100 grams of water at about 25° Celsius. The acid may be adipic acid, fumaric acid, tartaric acid, oxalic acid, glutaric acid, tannic acid, lactic acid, citric acid, benzoic acid, or a combination thereof.

The gum may be present in the cleaning composition in an amount of from 0.5% to 60%, from 1% to 40%, from 2% to 20%, from 5% to 10%, or any subrange or subvalue thereof, of the cleaning composition by weight. By way of further example, the gum may be present in the cleaning composition in an amount of about less than 0.5%, 0.5%, 1%, 2%, 3%, 4%, 5%, 6%, 7%, 8%, 9%, 10%, or greater than 10%, of the cleaning composition by weight. The gum may include gum arabic, guar gum, xantham gum, sodium carboxymethylcellulose, or a combination thereof. The gum may comprise gum arabic in an amount of 0% to 100% of the gum by weight. The gum may be any particle size. For example, the at least one gum size may have a particle size of at least 0.5 μm, 1 μm, 5 μm, 10 μm, 20 μm, 50 μm, less than 100 μm, or any particle size thereof.

The acid salt may be present in the cleaning composition in an amount of from 1% to 30%, from 2% to 20%, from 3% to 10%, about 5%, or any subrange or subvalue thereof, of the cleaning composition by weight. The acid salt may include sodium bisulfate, potassium bisulfate, ammonium bisulfate, or a combination thereof.

In some embodiments, the cleaning composition may include a chelating agent. The chelating agent may be present in the cleaning composition in an amount of from 0% to 40%, from 2% to 30%, from 5% to 20%, from 10% to 15%, or any subrange or subvalue thereof, of the cleaning composition by weight. The chelating agent may include EDTA tetra sodium salt in an amount of from 0% to 100% of the chelating agent by weight.

In a second aspect, a liquid cleaning formula is disclosed. The liquid cleaning formula comprises dissolving any embodiment of the cleaning composition in an aqueous medium. The aqueous medium may be at least 95% water by weight of the medium. In some embodiments, the aqueous medium is at a temperature of at least 32° Celsius.

An amount of from 5 g to 200 g, from 10 g to 175 g, from 20 g to 150 g, from 30 g to 100 g, or about 60 g of the cleaning composition may be dissolved in the aqueous medium per 1 gallon of the aqueous medium. The at least one acid and the at least one carbonate salt of the cleaning composition may react when contacted with the aqueous medium to produce carbon dioxide.

In a third aspect, a method of cleaning textile fibers is disclosed. The method comprises providing an embodiment of the cleaning composition and wetting the cleaning composition with water to form a liquid cleaner formula. For instance, the cleaning composition may comprise at least one acid in an amount of 25% to 50% of the cleaning composition by weight; at least one carbonate salt in an amount of 25% to 55% of the cleaning composition by weight; at least one gum in an amount of 0.5% to 10% of the cleaning composition by weight; at least one acid salt in an amount of 1% to 15% of the cleaning composition by weight; and, optionally, at least one a chelating agent in an amount of 0% to 25% of the cleaning composition by weight.

The wetting may comprise mixing the cleaning composition in an amount of from 5 g to 200 g, from 10 g to 175 g, from 20 g to 150 g, from 30 g to 100 g, or about 60 g per 1 gallon of water. In some embodiments, the wetting with water may comprise wetting the cleaning composition with heated water. The heated water may be at a temperature of at least 32° Celsius.

The method further comprises applying an amount of the liquid cleaner formula to one or more textile fibers. The applying may comprise spraying the amount of the liquid cleaner formula. The liquid cleaner formula may be at a temperature greater than 32° during the applying.

The method further comprises removing at least a portion of the amount of the liquid cleaner formula from the textile fibers.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

Figure 1:
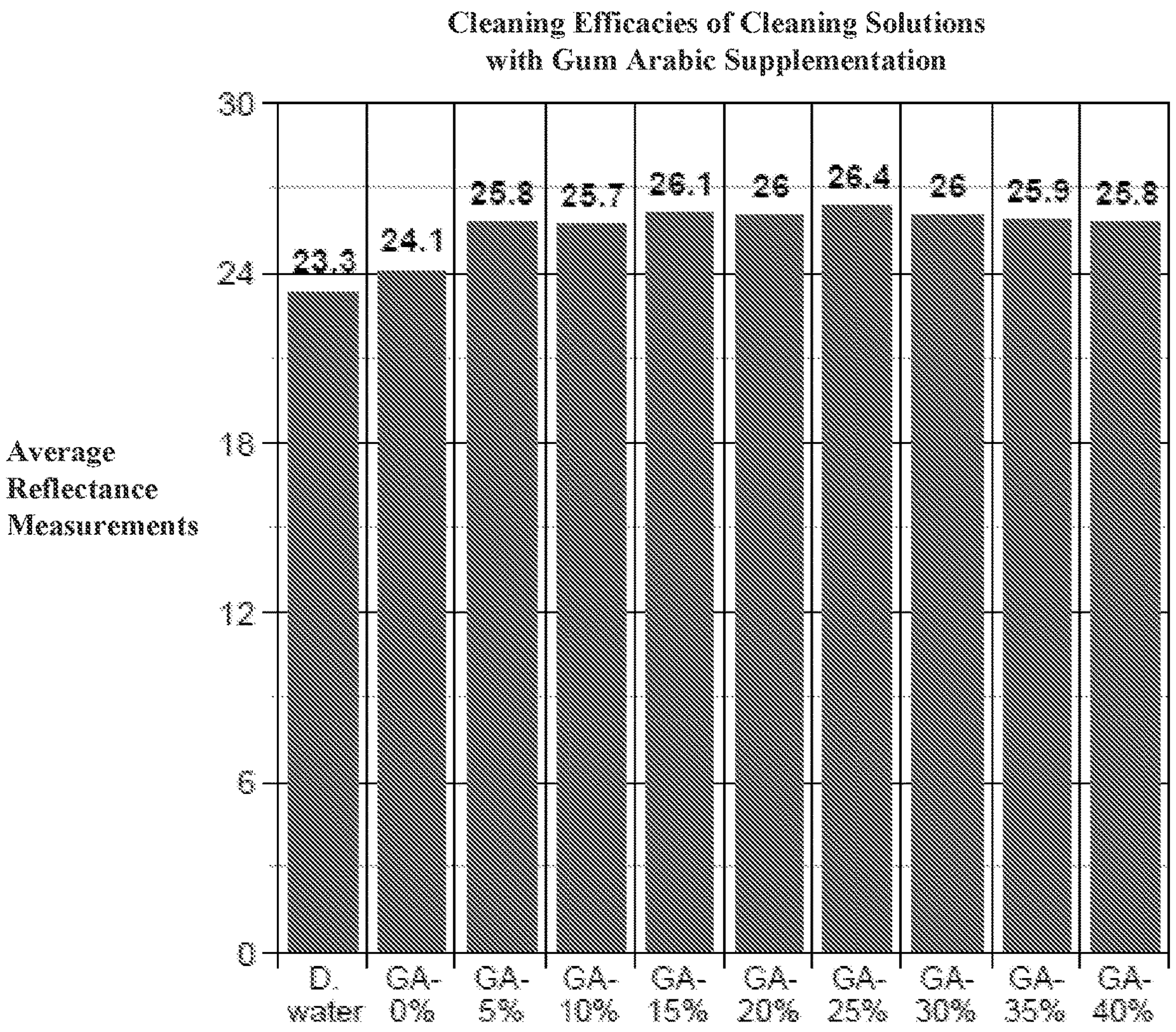
FIG. 1 is a graphical illustration of the efficacy of the cleaning solutions containing gum arabic according to various embodiments of the present invention as measured by average net reflectance.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well-known functions or constructions may not be described in detail for brevity or clarity.

The terminology used herein is for the purpose of describing particular embodiments only and is not intended to be limiting. As used herein, the singular forms "a," "an," and "the" are intended to include the plural forms as well, unless the context clearly indicates otherwise.

The terms "about" and "approximately" shall generally mean an acceptable degree of error or variation for the quantity measured given the nature or precision of the measurements. Typical exemplary degrees of error or variation are within 20 percent (%), preferably within 10%, and more preferably within 5% of a given value or range of values. For biological systems, the term "about" refers to an acceptable standard deviation of error, preferably not more than 2-fold of a given value. Numerical quantities given herein are approximate unless stated otherwise, meaning that the term "about" or "approximately" can be inferred when not expressly stated.

The term "surfactant" shall generally mean a soap or a detergent. More specifically, a "soap" is an amphipathic molecule consisting of an alkali salt, or mixture of salts, of long-chain fatty acids, wherein the acid end is polar or hydrophilic and the fatty acid chain is nonpolar or hydrophobic. Similarly, a "detergent" is a synthetic amphipathic molecule having a large non-polar hydrocarbon end that is oil-soluble and a polar end that is water-soluble.

The present disclosure provides cleaning compositions for cleaning textile fibers, such as those found in carpets, upholstery, drapery, clothing, bedding, linens, and the like. The cleaning composition includes at least one carbonate salt, at least one acid, at least one gum, at least one acid salt, and, optionally, at least one chelating agent.

The at least one carbonate salt is a salt of carbonic acid, which is characterized by the presence of a carbonate ion. For instance, the carbonate salt may be sodium carbonate (a water-soluble salt having a chemical formula of $Na_2CO_3$), sodium percarbonate, sodium bicarbonate, lithium carbonate, lithium percarbonate, lithium bicarbonate, potassium carbonate (a water-soluble salt with the formula. $K_2CO_3$), potassium percarbonate, potassium bicarbonate, ammonium carbonate, sodium sesquicarbonate, potassium sesquicarbonate, ammonium bicarbonate, or a combination thereof. In another embodiment, the carbonate salt may be sodium carbonate, sodium bicarbonate, potassium carbonate, potassium bicarbonate, or a combination thereof. The carbonate salt may be present in the cleaning composition in an amount of from 10% to 70%, 15% to 60%, from 20% to 55%, from 25% to 50%, from 27% to 45%, from 30% to 40%, or any subrange or subvalue thereof, of the cleaning composition by weight.

In some embodiments, the carbonate salt is comprised of at least two carbonate salts. For example, in one embodiment, the cleaning composition includes at least two carbonate salts where a first carbonate salt is present in an amount of from 5% to 50%, from 10% to 40%, from 15% to 35%, from 20% to 30%, or any subrange or subvalue thereof, of the cleaning composition by weight and the second carbonate salt is present in an amount of from 2% to 30%, from 5% to 20%, from 10% to 15%, or any subrange or subvalue thereof, of the cleaning composition by weight. In one embodiment, the cleaning composition includes sodium carbonate and potassium bicarbonate. In this aspect, sodium carbonate may be present in the cleaning composition in an amount of from 5% to 50%, from 10% to 40%, from 15% to 35%, from 20% to 30%, or any subrange or subvalue thereof, of the cleaning composition by weight and potassium bicarbonate may be present in the cleaning composition in an amount of from 2% to 30%, from 5% to 20%, from 10% to 15%, or any subrange or subvalue thereof, of the cleaning composition by weight. In another embodiment, the carbonate salt component of the cleaning composition may comprise sodium carbonate in an amount of from 0% to 100%, from 20% to 80%, or from 30% to 70% of the carbonate salt by weight and potassium bicarbonate in an amount of from 0% to 100%, from 20% to 80%, from 20% to 80%, or from 30% to 70% of the carbonate salt by weight.

The at least one add, as used herein, means a molecule, compound, or ion that can donate a proton or accept an electron pair in chemical reactions. The acid may be present in the cleaning composition in an amount of from 10% to 70%, from 20% to 60%, from 25% to 50%, from 30% to 45%, from 35% to 40%, or any subrange or subvalue thereof, of the cleaning composition by weight. Acids suitable for use with the present disclosure include, but are not limited to, adipic acid, fumaric acid, tartaric acid, oxalic acid, glutaric acid, tannic acid, lactic acid, citric acid, benzoic acid, malic acid, folic acid, acetic acid, uric acid, gallic acid, acetylsalicylic acid, glutamic acid, gluconic acid, propiolic acid, benzylic acid, boric acid, phosphoric acid, formic acid, malonic acid, phthalic acid, ascorbic acid, cinnamic acid, or a combination thereof. In another embodiment, the acid may be adipic acid, fumaric acid, tartaric acid, oxalic acid, glutaric acid, tannic acid, lactic acid, citric acid, benzoic acid, or a combination thereof. In still another embodiment, the acid may be adipic acid, fumaric acid, or a combination thereof.

In some embodiments, the acid may have a low solubility, such that it may have a delayed reaction with the carbonate salt (as compared to a high solubility acid when the acid and carbonate salt are contacted together with water). The acid is preferred to have a solubility of approximately two grams of acid per one hundred grams of water at 25° Celsius. For example, the acid may be adipic acid ($(CH_2)_4(COOH)_2$) with a solubility of about 2.4 grams per one hundred grams of water at 25° Celsius, fumaric acid ($HO_2CCH{=}CHCO_2H$) with a solubility of 0.63 grams per one hundred grams of water at 25° Celsius, or a combination thereof.

Advantageously, when the composition containing the carbonate salt and the acid is contacted with an aqueous medium, the cleaning composition produces carbonation (i.e., the carbonation is "activated"). That is, upon contact with the aqueous medium, the carbonate salt and the acid react with the aqueous medium to produce gaseous carbon dioxide. Thus, the cleaning composition may be internally carbonated by chemical reaction when the cleaning composition is exposed to an aqueous medium.

The activation of carbonation may be delayed and occur a period of time after the composition is contacted with the aqueous medium. Moreover, acids having a low solubility may delayedly react with the carbonate salt when exposed to an aqueous medium, thus resulting in a delayed onset of carbonation as compared to high solubility acids. For instance, the carbonation may be delayed by at least 10 seconds, at least 30 seconds, at least 1 minute, at least 2 minutes, at least 5 minutes, at least 10 minutes, or any subrange or subvalue thereof. This delayed carbonation provides a user of the cleaning composition sufficient time to expose the cleaning composition to an aqueous medium and apply the composition to textile fibers before any considerable amount of the carbonation is lost to the atmosphere. This is particularly advantageous where cleaning compositions are first mixed with water and then applied a time period after mixing, such as with commercial carpet cleaning apparatuses. As a result, a greater quantity of carbonation may be applied to the textile fibers, thus enhancing the effectiveness of the cleaning composition.

The resulting carbonation is highly beneficial for cleaning textile fibers. When applied to textile fibers, the carbonation causes a rapid lifting action due to the presence of a multitude of effervescent carbon dioxide bubbles. The carbon dioxide bubbles surround soil and/or oil present on the soiled textile fibers, thereby freeing and lifting the soil and/or oil from the fibers.

Specifically, the soil and/or oil particles are surrounded by a complex of carbon dioxide bubbles and polar and non-polar ended molecules that bind with and suspend the particles in a surrounding carbonating aqueous environment. While "aqueous" is generally understood to mean that there is a certain amount of water present, the present invention does not contemplate the use of excess water. In fact, it has been found that a slight dampening of the fibers may be sufficient to promote the lifting action of the cleaning composition and to loosen or dislodge the soil and oil particles from the fibers. Indeed, it is an important advantage of the cleaning composition disclosed herein that only minimal amounts of an aqueous medium may be required to effect a thorough cleaning of soiled textile fibers, thus reducing the dry time of the textile fibers. In contrast, excess amounts of water are normally used to remove the unwanted residues that are often left behind by surfactant-containing cleaners.

Once the carbonation has interacted with the soil and oil particles, the particles may be held in suspension for a time sufficient for them to be removed from the fiber by means of vacuuming or adsorption onto a pad, towel, or similar adsorbent material. Consequently, the soil and oil particles may be removed from the textile, leaving behind clean, unsoiled fibers. As used herein, "clean" or "unsoiled" fibers mean that at least a portion of soil and/or oil have been removed from the textile fibers. In some embodiments, the at least a portion of soil and/or oil removed is the majority of, or substantially all of, the soil and/or oil. In another embodiment, "clean" or "unsoiled" fibers are defined as fibers having been cleaned with the methods described herein that have less soil and/or oil than the same fibers cleaned with only distilled water.

The composition may be free or substantially free of additives that interfere with the creation of carbonation. As used herein, "substantially free of" means that only trace components of a particular component may be found in the cleaning composition. Additives that the composition can be free or substantially free of include, but are not limited to, alcohols, glycol ethers, surfactants, detergents, and combinations thereof. Such additives may, for example, reduce the surface tension of the carbon dioxide bubbles and release the $CO_2$ that lifts soil and oil particles from the textile fibers. Thus, if any such additive was included in the compositions, the cleaning efficacy of the composition would be reduced.

Furthermore, as a result of the lifting action of the carbonation, the cleaning composition does not require a surfactant to clean textile fibers. Indeed, the cleaning composition may be free or substantially free of a surfactant. Therefore, the cleaning composition may avoid all the problems previously described as associated with surfactant use, including leaving behind a soil-attracting residue that leads to re-soiling and brown out. Thus, an intended purpose of the present disclosure is to provide an effective cleaning composition that is naturally derived and free, or substantially free of, surfactants. In this regard, the cleaning composition may include less than 1% by weight of surfactant, less than 0.5% by weight of surfactant, less than 0.2% by weight of surfactant, less than 0.1% by weight of surfactant, or any subrange or subvalue thereof. In one embodiment, the cleaning composition includes no detectable amount of surfactant.

The cleaning composition includes at least one gum. The at least one gum may be gum arabic, guar gum, xantham gum, sodium carboxymethylcellulose, or a combination thereof. The at least one gum may be present in the cleaning composition in an amount of from about 0.1% to about 60%, from about 1% to about 40%, from about 2% to 20%, from about 5% to about 10% or any subrange or subvalue thereof, of the cleaning composition by weight. By way of further example, the gum may be present in the cleaning composition in an amount of about less than 0.01%, 0.05%, 0.1%, 0.3%, 0.5%, 1%, 2%, 3%, 4%, 5%, 6%, 7%, 8%, 9%, 10%, or greater than 10%, of the cleaning composition by weight. The gum may comprise gum arabic in an amount of 0% to 100% of the at least one gum by weight. For example, in one embodiment, the gum includes at least two gums. In this aspect, the first gum may include guar gum, xantham gum, sodium carboxymethylcellulose, or a combination thereof and the second gum may include gum arabic. In another embodiment, the gum is gum arabic and is included in the cleaning composition in an amount of from about 5% to about 60% by weight of the cleaning composition. In another embodiment, the gum is gum arabic and is included in the cleaning composition in an amount of from about 10% to 40% by weight of the cleaning composition. For example, when gum arabic is used as the gum component of the cleaning composition, it may be included in an amount of from 15% to 30% by weight of the cleaning composition.

It has been unexpectedly discovered that cleaning compositions including gum are highly beneficial to the effectiveness of the cleaning composition. It was surprisingly found that the gum interacted with the carbonation produced from the acid and the carbonate salt to produce a highly effective cleaning composition. Specifically, including gum arabic in the cleaning composition unexpectedly resulted in both greater cleaning efficacy and improved prevention of re-soiling.

This is particularly surprising and unexpected, as one would have predicted, without being bound to any particular theory, that the inclusion of gum arabic would hinder the cleaning of soiled textiles due to its chemical structure. Specifically, gum arabic is a branched-chain, complex polysaccharide, having both hydrophilic and hydrophobic affinities. The backbone of gum arabic is composed of 1,3-linked β-d-galactopyranosyl units. It is believed that gum arabic is composed of two fractions: (1) the polysaccharides chain, corresponding to the greater part of its structure (e.g., d-galactose, l-arabinose, l-rhamnose, d-glucuronic acid), and (2) protein content. Due to this mixture of polysaccharides and proteins, gum arabic may have "glue-like" and thickening properties, such as tackiness, when exposed to an aqueous medium. As a result, it would not be expected that the use of gum arabic in a cleaning composition dissolved in an aqueous medium would satisfactorily clean soiled textiles, as one would expect that the tackiness of gum arabic would have the opposite effect to inhibit removal of any oil or soil particles on the textiles as well as increase the potential for re-soiling.

However, through testing, it was determined that a combination of gum arabic and carbonation (created from exposure of carbonate salt and acid to an aqueous medium) resulted in increased cleaning and decreased re-soiling of textiles as compared to carbonation alone. Again, without being bound by any particular theory, it is believed that the mixture of polysaccharides and proteins in gum arabic may adhere to and encapsulate oil and/or soil particles present on the textile fibers. Specifically, it is contemplated that the hydrophobic protein component of gum arabic associates with the surface of the oil and soil particles, whereas the hydrophilic carbohydrate fraction is oriented toward the aqueous phase and inhibits flocculation and coalescence through electrostatic and steric repulsions, thereby preventing re-deposition of the soils and oils. Thus, the gum component of the cleaning composition and, more specifically, when the gum is gum arabic, the cleaning performance of the cleaning compositions is improved through what is believed to be an improvement in the emulsification of soils and oil particles. As a result, the carbonation may more easily lift the particles to the surface of the textile fibers for easy and effective removal without the need for surfactants.

The cleaning compositions of the present disclosure provide improved cleaning performance, as measured by reflectance, as compared to formulations of distilled water. For example, the cleaning compositions of the present disclosure demonstrate an increase in reflectance of at least about 3.1 when compared to formulations of distilled water. In another embodiment, the cleaning compositions of the present disclosure demonstrate an increase in reflectance of at least about 2.8 when compared to formulations of distilled water. In still another embodiment, the cleaning compositions of the present disclosure demonstrate an increase in reflectance of at least about 2.5 when compared to formulations of distilled water. Indeed, the increased reflectance values indicate that the cleaning compositions of the present disclosure have better cleaning efficacy than distilled water.

In other embodiments, the cleaning compositions of the present disclosure provide improved cleaning performance, as measured by reflectance, as compared to other cleaning formulations free of or substantially free of surfactants and without a gum component. For instance, the cleaning compositions of the present disclosure show an increase in reflectance of at least about 2.3 when compared to other cleaning formulations without the gum component. In another embodiment, the cleaning compositions of the present disclosure show an increase in reflectance of at least about 2.0 when compared to other cleaning formulations without the gum component. In still another embodiment, the cleaning compositions of the present disclosure show an increase in reflectance of at least about 1.8 when compared to other cleaning formulations without the gum component. These increased reflectance values indicate that the cleaning compositions of the present disclosure have better cleaning efficacy than other cleaning formulations free of or substantially free of surfactants and without a gum component.

The at least one gum may be of varied particle sizes. For example, the at least one gum size may have a particle size of at least 0.5 μm, 1 μm, 5 μm, 10 μm, 20 μm, 50 μm, less than 100 μm, or any particle size within the thereof ranges. Specifically, a smaller particle size may be advantageous in that it would more easily dissolve in an aqueous medium.

The cleaning composition comprises at least one acid salt. An acid salt is a salt of a polybasic acid (i.e., an acid having two or more acidic hydrogens) in which there is only partial replacement of the hydrogen ions from the parent acid, leaving some degree of acidity. For example, the acid salt may include sodium bisulfate ($NaHSO_4$), potassium bisulfate ($KHSO_4$), ammonium bisulfate ($(NH_4)HSO_4$), or a combination thereof. The acid salt may be present in the cleaning composition in an amount of from 1% to 30%, from 2% to 20%, from 3% to 10%, about 1% to 5%, or any subrange or subvalue thereof, of the cleaning composition by weight.

The presence of an acid salt in the cleaning composition has several beneficial aspects for the cleaning composition. For example, the sodium bisulfate, also known as sodium hydrogen sulfate, may reduce any odors that may be present on the soiled textiles by chemically reacting with the odor-causing molecules, thereby rendering the molecules odorless. Second, sodium bisulfate may effectively reduce any discoloring, such as yellowing, of the textile fibers. Third, sodium bisulfate may promote cleanliness of the textile fibers through its fungicide, herbicide, and microbicide properties. Fourth, the presence of sodium bisulfate may increase the solubility of the cleaning composition when the composition is contacted with an aqueous medium. Finally, the compound is environmentally friendly and relatively safe for humans and pets alike. Importantly, sodium bisulfate does not interfere with the cleaning effectiveness of the carbonation or gum arabic of the cleaning composition.

The cleaning composition may comprise at least one chelating agent. A chelating agent is a chemical compound capable of reacting with metal ions to form a stable, water-soluble complex. For example, the chelating agent may be ethylene diamine tetra acetate (EDTA) tetra sodium salt, sodium gluconate, dissolvine GL-38 (GLDA), methylglycinediacetic acid (MGDA), pentetic acid (DTPA), iminodisuccinic acid (IDS), phosphonates, sodium citrate, or a combination thereof. When included in the cleaning composition, the chelating agent may be present in the cleaning composition in an amount of from 1% to 40%, from 2% to 30%, from 5% to 20%, from 10% to 15%, or any subrange or subvalue thereof, of the cleaning composition by weight. The chelating agent may include EDTA tetra sodium salt in an amount of from 0% to 100% of the chelating agent by weight. Advantageously, the chelating agent may surround any unwanted metal that may be present in an aqueous medium (e.g., hard water) that is contacted with the cleaning composition or unwanted metal soil (e.g., rust stains) in the textile fibers. The chelating agent may form soluble complexes with this metal, thereby suspending the ions, such that the cleaning composition may work more effectively on the textile fibers. Indeed, the suspended metal may be removed from the textile fibers along with removal of the oil and soil particles as described above.

The cleaning composition may be formulated to be a dry, solid granular or dry, solid particulate form. As used herein, "dry" means not dissolved in water rather than free from all moisture. Specifically, each of the individual components of the cleaning composition (e.g., the at least one acid, the at least one carbonate salt, the at least one gum, the at least one acid salt, and the at least one chelating agent) may be in solid form. Solid forms may advantageously allow the cleaning composition to be formulated in a dry granular form, which would be beneficial for handling, packaging, and transporting of the cleaning composition to a user. Further, a dry granular form would allow the cleaning composition to be "scoopable" for easily measuring and dispensing a precise amount of the cleaning composition to be used.

Tables 1-7 below show embodiments of the cleaning composition in dry granular form.

TABLE 1

| Compounds | Percentage of the Cleaning Composition by Weight |
|---|---|
| Adipic Acid | 35% |
| Sodium Carbonate | 25% |
| Potassium Bicarbonate | 10% |
| Gum Arabic | 10% |
| Sodium Bisulfate | 10% |
| EDTA tetra sodium salt | 10% |

TABLE 2

| Compounds | Percentage of the Cleaning Composition by Weight |
|---|---|
| Adipic Acid | 40% |
| Sodium Carbonate | 20% |
| Potassium Bicarbonate | 15% |
| Gum Arabic | 10% |
| Sodium Bisulfate | 3% |
| EDTA tetra sodium salt | 12% |

TABLE 3

| Compounds | Percentage of the Cleaning Composition by Weight |
|---|---|
| Adipic Acid | 37% |
| Sodium Carbonate | 30% |
| Potassium Bicarbonate | 15% |
| Gum Arabic | 5% |
| Sodium Bisulfate | 5% |
| EDTA tetra sodium salt | 8% |

TABLE 4

| Compounds | Percentage of the Cleaning Composition by Weight |
|---|---|
| Adipic Acid | 20% |
| Sodium Carbonate | 27% |
| Potassium Bicarbonate | 5% |
| Gum Arabic | 20% |
| Sodium Bisulfate | 11% |
| EDTA tetra sodium salt | 17% |

TABLE 5

| Compounds | Percentage of the Cleaning Composition by Weight |
|---|---|
| Adipic Acid | 22% |
| Sodium Carbonate | 20% |
| Potassium Bicarbonate | 12% |
| Gum Arabic | 28% |
| Sodium Bisulfate | 8% |
| EDTA tetra sodium salt | 7% |
| Other | 3% |

TABLE 6

| Compounds | Percentage of the Cleaning Composition by Weight |
|---|---|
| Adipic Acid | 35% |
| Sodium Carbonate | 22% |
| Potassium Bicarbonate | 13% |
| Gum Arabic | 17% |
| Sodium Bisulfate | 13% |

TABLE 7

| Compounds | Percentage of the Cleaning Composition by Weight |
|---|---|
| Adipic Acid | 28% |
| Sodium Carbonate | 27% |
| Potassium Bicarbonate | 11% |
| Gum Arabic | 30% |
| Sodium Bisulfate | 4% |

Tables 1-7 are exemplary of embodiments of the cleaning composition of the present disclosure. Indeed, consistent with the present disclosure, the amounts of the compounds of the cleaning composition may be varied in accordance with the amounts of the compounds provided for additional exemplary embodiments.

An embodiment of the cleaning composition having at least 5% gum arabic by weight was found to be highly effective in cleaning textile fibers at a low concentration in an aqueous medium and preventing re-soiling. Additionally, when the cleaning composition contains a preservative (such as EDTA tetra sodium) and is mixed with an aqueous medium, the resulting mixture may be stable for three months at temperatures greater than 32° Celsius. In another embodiment, the resulting mixture may be stable for two months at temperatures greater than 32° Celsius. In still another embodiment, the resulting mixture may be stable for one month at temperatures greater than 32° Celsius. This high temperature, long term stability is important for transportation of the mixture and storage of the mixture, especially in typically warm geographical locations.

Other embodiments of the disclosure may be a liquid, a gel, a paste, or a solid. In an aspect of the disclosure, a liquid cleaning formula is disclosed. The liquid cleaning formula comprises the cleaning composition disclosed herein dissolved into an aqueous medium. The aqueous medium may be at least 95% water by weight of the medium. An amount of from 5 grams to 200 grams, from 10 grams to 175 grams, from 20 grams to 150 grams, from 30 grams to 100 grams, or about 60 grams of the cleaning composition may be dissolved in the aqueous medium per 1 gallon of the aqueous medium. Once the cleaning composition is dissolved in the aqueous medium, the at least one acid and the at least one carbonate salt of the cleaning composition may react with the aqueous medium to produce carbon dioxide as described above. In one embodiment, the liquid cleaning formula may have a pH of from about 4 to about 8. In another embodiment, the liquid cleaning formula may have a pH of from about 5 to about 7. In still another embodiment, the liquid cleaning formula may have a pH of from about 5.5 to about 7.

Tables 8 and 9 below show an embodiment of the liquid cleaning formula, wherein 60 g of the cleaning composition detailed in Table 1 is dissolved in 1 gallon of an aqueous medium.

TABLE 8

| Compounds | Percentage of the Liquid Cleaning Formula by Weight |
|---|---|
| Adipic Acid | 0.45%-0.70% |
| Sodium Carbonate | 0.02%-0.5% |
| Potassium Bicarbonate | 0.1%-0.6% |
| Gum Arabic | 0.01%-0.3% |
| Sodium Bisulfate | 0.1%-0.2% |
| EDTA tetra sodium salt | 0.0%-0.3% |

TABLE 9

| Compounds | Percentage of the Liquid Cleaning Formula by Weight |
|---|---|
| Adipic Acid | 0.5%-0.8% |
| Sodium Carbonate | 0.05%-0.6% |
| Potassium Bicarbonate | 0.1%-0.5% |
| Gum Arabic | 0.001%-0.4% |
| Sodium Bisulfate | 0.07%-0.15% |
| EDTA tetra sodium salt | 0.0%-0.2% |

A method of cleaning textile fibers is provided, the method including providing an embodiment of the cleaning composition disclosed herein and wetting the cleaning composition with water to form a liquid cleaner formula. For instance, the cleaning composition may comprise at least one acid in an amount of 25% to 50% of the cleaning composition by weight; at least one carbonate salt in an amount of 25% to 55% of the cleaning composition by weight; at least one gum in an amount of 0.5% to 10% of the cleaning composition by weight; at least one acid salt in an amount of 1% to 15% of the cleaning composition by weight; and, optionally, at least one a chelating agent in an amount of 0% to 25% of the cleaning composition by weight.

The wetting may comprise mixing the cleaning composition in an amount of from 5 g to 200 g, from 10 g to 175 g, from 20 g to 150 g, from 30 g to 100 g, or about 60 g per 1 gallon of water. Upon wetting, the acid and the carbonate salt of the cleaning composition may interact with the water to produce carbon dioxide as described above.

In some embodiments, the method comprises heating the water or the liquid cleaner formula. The water or the liquid cleaner formula may be heated to a temperature ranging from about 25° Celsius to about 100° Celsius. In another embodiment, the water or the liquid cleaner formula may be heated to a temperature ranging from about 27° Celsius to about 90° Celsius. In still another embodiment, the water or the liquid cleaner formula may be heated to a temperature ranging from about 30° Celsius to about 80° Celsius. In yet another embodiment, the water or the liquid cleaner formula may be heated to a temperature ranging from about 32° Celsius to about 70° Celsius. In still another embodiment, the water or the liquid cleaner formula may be heated to a temperature ranging from about 40° Celsius to about 60° Celsius. For example, the water or the liquid cleaner formula may be heated to a temperature of about 50° Celsius. A higher temperature is advantageous for easily dissolving the cleaning composition into the aqueous medium to form the liquid cleaning formula. Moreover, a higher temperature may also increase the effectiveness of the cleaning formula in lifting oil and soil particles from the textile fibers. The increased temperature may aid in ease of mixing the cleaning composition into the water to form the liquid cleaner formula.

The liquid cleaner formula may be disposed in, provided, and stored in a sealed container. By holding the liquid cleaner in a sealed container, a user may reduce the amount of carbonation that escapes. Thus, a greater quantity of carbonation will be available for use in cleaning the textile fibers. Advantageously, the cleaning composition may remain carbonated for up to 3 days after the carbonate salt and the acid are contacted with the aqueous medium. In another embodiment, the cleaning composition may remain carbonated for up to 2 days after the carbonate salt and the acid are contacted with the aqueous medium. In still another embodiment, the cleaning composition may remain carbonated for up to 24 hours after the carbonate salt and the acid are contacted with the aqueous medium.

The method comprises applying an amount of the liquid cleaner formula to one or more textile fibers. The liquid cleaner formula may be at any temperature during the applying. In some embodiments, the formula is heated. For example, the liquid cleaning formula may be at a temperature greater than 32° Celsius during the applying. In another embodiment, the liquid cleaning formula may be at a temperature of about 32° Celsius to about 100° Celsius during the applying. In still another embodiment, the liquid cleaning formula may be at a temperature of about 40° Celsius to about 80° Celsius during the applying. An elevated application temperature may be advantageous in more effectively removing oil and soil from the textile fibers.

The applying may comprise spraying the amount of the liquid cleaner formula onto the one or more textile fibers. For example, when the liquid cleaner formula is contained in a pressurized container and sprayed through a wand in fluid connection with the container, the pressure is released when the cleaner formula is exposed to the environment, and the carbonation of the liquid cleaner formula produces a plurality of effervescent carbon dioxide bubbles that rapidly descend into the textile fibers, where the bubbles then work to loosen and entrap any soil or oil particles. The liquid cleaner formula may be worked into the fibers by the spraying force, agitated using a rotary extraction device, cleaning wand, cleaning upholstery tool, or other similar means to encourage penetration of the carbon dioxide bubbles into the textile fibers.

The method further comprises removing at least a portion of the amount of the liquid cleaner formula from the textile fibers. The carbonation of the cleaner formula quickly lifts the cleaner formula, along with the suspended soil and oil particles, to the surface of the textile fibers. The cleaner formula and the suspended particles may then be removed from the textile fibers by vacuuming or transferring to an adsorptive surface, such as a textile pad, a towel, or other similar adsorbent material. In some embodiments, substantially all of the applied liquid cleaner formula (i.e., greater than 75% by weight applied) is removed from the textile fibers. After removal, little to no liquid cleaner formula remains on the textile fibers, thus reducing the potential for soil re-deposition and discoloration. The treated textile fibers are clean and unsoiled.

EXAMPLES

The following non-limiting examples demonstrate the cleaning efficacy and prevention of soil re-deposition of cleaning compositions that may be made in accordance with the present disclosure. The examples are merely illustrative of the preferred embodiments of the present disclosure and are not to be construed as limiting the disclosure, the scope of which is defined by the appended claims.

Working Example: Addition of Gum Arabic to Cleaning Composition Enhances Cleaning Efficacy and Prevention of Soil Re-Deposition Surprisingly, it has been discovered that the addition of gum and, more specifically, gum arabic, to a cleaning composition comprising adipic acid, sodium carbonate, potassium bicarbonate, sodium bisulfate, and optionally EDTA tetra sodium salt unexpectedly increased the cleaning efficacy and soil re-deposition prevention of the composition. Indeed, as described below, the gum arabic-supplemented cleaning composition generally resulted in higher average reflectance measurements than the un-supplemented cleaning composition, thereby indicating that the addition of gum arabic led to cleaner textile fibers and less soil re-deposition.

Cleaning Efficacy Methods & Results

Preparation of Cleaning Solution Samples and Controls. Eight cleaning solution samples containing varying amounts of gum arabic were prepared. Each sample also contained the following in the same amounts across the samples in accordance with the disclosure: adipic acid, sodium carbonate, potassium bicarbonate, sodium bisulfate, and EDTA tetra sodium salt.

The varying amounts of gum arabic tested in the eight samples were: 5%, 10%, 15%, 20%, 25%, 30%, 35%, and 40%. To create the eight samples, 60 g, in total, of gum arabic, adipic acid, sodium carbonate, potassium bicarbonate, sodium bisulfate, and EDTA tetra sodium salt, including the appropriate percentage of gum arabic per that sample, were dissolved in 1 gallon of distilled water. Two control samples were prepared: a sample of distilled water and a sample containing adipic acid, sodium carbonate, potassium bicarbonate, sodium bisulfate, and EDTA tetra sodium salt dissolved into distilled water (i.e., no gum arabic).

Preparation of Soiled Carpet Samples and Application of Cleaning Solution Samples. Identical carpet samples were soiled in an identical manner to ensure consistent testing.

After soiling, each carpet sample was vacuumed three times in both the lengthwise and widthwise directions in equal durations between the samples. Each carpet sample was then divided into multiple carpet sections. The reflectance measurement of each of the carpet sections was measured. The average reflectance measurement of each section was determined, and standard deviations were calculated (av1).

To test the effectiveness of the aforementioned cleaning solution samples, each carpet section was sprayed with 10 mL of one of the cleaning solution samples or the controls. After application, the cleaning solution samples were agitated into the respective carpet sections. After allowing the solutions to sit, the sections were rinsed with water five times in a single direction. Afterwards, the carpet sections were allowed to air dry at ambient conditions for 24 hours.

Once dry, the reflectance measurement of each carpet section was measured. The average reflectance measurement of each section was determined using a 577 PC Photoreflectometer from Photovolt Instruments, and standard deviations were calculated (av2).

Evaluation of Cleaning Efficacy. To determine the net cleaning effectiveness of each cleaning solution sample, av1 was subtracted from the av2 of the cleaning solution sample. Table 10, below, presents the cleaning efficacy of each sample as measured by net average reflectance (av2−av1). A higher reflectance value indicates better cleaning efficacy. FIG. 1 is a graphical representation of the cleaning efficacies set forth in Table 10.

TABLE 10

| Cleaning Solution Sample | Cleaning Efficacy as Measured by Reflectance (av2-av1) |
|---|---|
| Distilled water | 23.3 |
| Cleaning solution - no GA* | 24.1 |
| Cleaning solution - 5% GA | 25.8 |
| Cleaning solution - 10% GA | 25.7 |
| Cleaning solution - 15% GA | 26.1 |
| Cleaning solution - 20% GA | 26.0 |
| Cleaning solution - 25% GA | 26.4 |
| Cleaning solution - 30% GA | 26.0 |
| Cleaning solution - 35% GA | 25.9 |
| Cleaning solution - 40% GA | 25.8 |

*GA stands for gum arabic.

As can be seen in FIG. 1 and Table 10, the addition of gum arabic caused an unexpected increase in cleaning efficacy. Specifically, the distilled water sample and the sample without gum arabic resulted in average reflectance measurements of 23.3 and 24.1, respectively. However, all samples containing gum arabic resulted in average reflectance measurements of greater than 25.0, with a peak of 26.4 for the sample containing 25% gum arabic. Thus, despite expectations that gum arabic may cause a certain "tackiness" when combined with water, the cleaning solutions containing gum arabic resulted in greater removal of soil from the carpet samples as compared to the control solutions (distilled water and cleaning solution without gum arabic). As a result, the addition of gum arabic surprisingly resulted in increased cleaning capabilities. The increase in cleaning effectiveness is especially notable and unexpected, as the increase in reflectance from distilled water as compared to the cleaning solution without gum arabic was of 0.8 (from 23.3 to 24.1). Meanwhile, the increase in reflectance from the cleaning solution without gum arabic as compared to the lowest measured reflectance value for gum arabic solution (10% GA) was 1.6 (from 24.1 to 25.7), a measured double increase in difference in reflectance as compared to the difference in reflectance of the cleaning solution without gum arabic compared to water. This dramatic increase in cleaning effectiveness of gum arabic for removing soil is highly unexpected and surprising.

Soil Re-Deposition Methods & Results

Preparation of Materials. For testing of soil re-deposition capabilities, the cleaning solution samples and controls were prepared as described above in the "Cleaning Efficacy Methods & Results" section.

Preparation of Carpet Samples and Application of Cleaning Solution Samples. Identical carpet samples were vacuumed three times in both the lengthwise and widthwise directions. Then, each carpet sample was divided into multiple carpet sections. Each section was sprayed with 10.0 mL of one of the cleaning solution samples or controls. Immediately after application of the cleaning solution sample, the solution was agitated into the respective carpet section. Each section was then allowed to air dry at ambient conditions for 24 hours.

After drying, each carpet sample was soiled in an identical manner to ensure consistent testing. After soiling, each carpet sample was vacuumed in both the lengthwise and widthwise directions in equal durations as to between the samples. Following vacuuming, the reflectance measurements of each carpet section was measured. The average reflectance measurement of each section was determined using a 577 PC Photoreflectometer from Photovolt Instruments, and standard deviations were calculated (av1).

Figure 2:
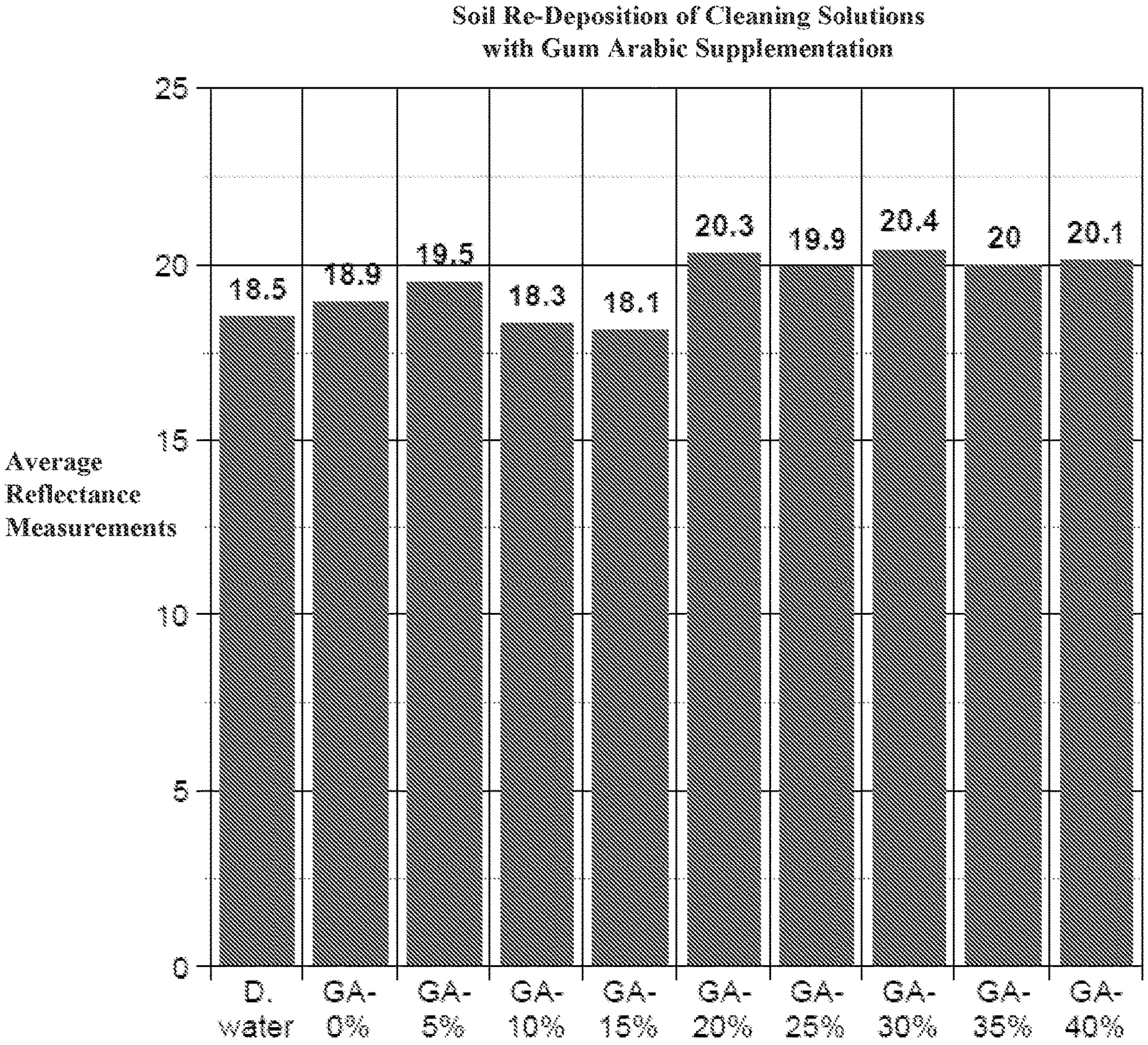
FIG. 2 is a graphical illustration of soil re-deposition after application of cleaning solutions containing gum arabic according to various embodiments of the present invention as measured by average reflectance.

Evaluation of Soil Re-Deposition Capability. Table 11, below, presents the soil re-deposition capabilities of each sample as measured by average reflectance (av1). FIG. 2 is a graphical representation of the soil re-deposition capabilities set forth in Table 11.

TABLE 11

| Cleaning Solution Sample | Cleaning Efficacy as Measured by Reflectance (av1) |
|---|---|
| Distilled water | 18.5 |
| Cleaning solution - no GA* | 18.9 |
| Cleaning solution - 5% GA | 19.5 |
| Cleaning solution - 10% GA | 18.3 |
| Cleaning solution - 15% GA | 18.1 |
| Cleaning solution - 20% GA | 20.3 |
| Cleaning solution - 25% GA | 19.9 |
| Cleaning solution - 30% GA | 20.4 |
| Cleaning solution - 35% GA | 20.0 |
| Cleaning solution - 40% GA | 20.1 |

*GA stands for gum arabic.

As can be seen in FIG. 2 and Table 11, the addition of gum arabic generally resulted in less soil re-deposition. Specifically, the distilled water sample and the sample without gum arabic resulted in average reflectance measurements of 18.5 and 18.9, respectively. However, with the exception of the cleaning solutions with 10% and 15% gum arabic, the addition of gum arabic resulted in higher reflectance measurements as compared to the controls, with a peak of 20.4 for cleaning solution with 30% gum arabic, thereby indicating less soil re-deposition on the carpet sections.

Thus, despite expectations that gum arabic may generate some stickiness when combined with water that causes resoiling, the cleaning solutions containing certain concentrations of gum arabic actually resulted in less soil re-depositing onto the carpet samples as compared to the control solutions (distilled water and cleaning solution without gum arabic). As a result, the addition of gum arabic surprisingly resulted in increased soil re-deposition capabilities.

What is claimed is:

1. A method of cleaning textile fibers soiled by oil particles, soil particles, or combinations thereof, comprising:
providing a cleaning composition comprising:
at least one acid in an amount of 25 percent to 70 percent of the cleaning composition by weight,
at least one carbonate salt in an amount of 25 percent to 70 percent of the cleaning composition by weight,
at least one gum in an amount of about 1 percent to 40 percent of the cleaning composition by weight,
at least one acid salt in an amount of about 1 percent to about 30 percent by weight, and
at least one chelating agent,
wherein the cleaning composition includes less than 0.1 percent surfactant by weight;
dissolving the cleaning composition in water to form a liquid cleaner formula;
applying an amount of the liquid cleaner formula to one or more textile fibers, wherein the liquid cleaner formula dislodges at least a portion of the oil particles, soil particles, or combinations thereof from the textile fibers; and
removing at least a portion of the amount of the liquid cleaner formula from the one or more textile fibers.

2. The method of claim 1, wherein the acid comprises adipic acid, fumaric acid, tartaric acid, oxalic acid, glutaric acid, tannic acid, lactic acid, citric acid, benzoic acid, or a combination thereof.

3. The method of claim 1, wherein the carbonate salt comprises sodium carbonate, sodium percarbonate, sodium bicarbonate, lithium carbonate, lithium percarbonate, lithium bicarbonate, potassium carbonate, potassium percarbonate, potassium bicarbonate, ammonium carbonate, sodium sesquicarbonate, potassium sesquicarbonate, ammonium bicarbonate, or a combination thereof.

4. The method of claim 1, wherein the gum comprises gum arabic, guar gum, xantham gum, sodium carboxymethylcellulose, or a combination thereof.

5. The method of claim 1, wherein the acid salt comprises sodium bisulfate, potassium bisulfate, ammonium bisulfate, or a combination thereof.

6. The method of claim 1, wherein the step of dissolving comprises mixing the cleaning composition in an amount of from 5 g to 600 g per 1 gallon of water.

7. The method of claim 1, further comprising heating the water or the liquid cleaner formula before the applying step.

8. The method of claim 1, wherein the cleaning composition is free of surfactants.

9. A method of cleaning textile fibers soiled by oil particles, soil particles, or combinations thereof, comprising:
providing a cleaning composition comprising:
at least one acid in an amount of 25 percent to 70 percent of the cleaning composition by weight,
at least one carbonate salt in an amount of 25 percent to 70 percent of the cleaning composition by weight,
at least one gum in an amount of about 1 percent to 40 percent of the cleaning composition by weight,
at least one acid salt in an amount of about 1 percent to about 30 percent by weight, wherein the acid salt comprises a bisulfate, and
at least one chelating agent in an amount of about 1 percent to 40 percent by weight,
wherein the cleaning composition includes less than 0.2 percent surfactant by weight;
dissolving the cleaning composition in water to form a liquid cleaner formula;
applying an amount of the liquid cleaner formula to one or more textile fibers, wherein the liquid cleaner formula suspends at least a portion of the oil particles, soil particles, or combinations thereof from the textile fibers; and
removing at least a portion of the amount of the liquid cleaner formula from the one or more textile fibers.

10. The method of claim 9, wherein the acid comprises adipic acid, fumaric acid, tartaric acid, oxalic acid, glutaric acid, tannic acid, lactic acid, citric acid, benzoic acid, or a combination thereof.

11. The method of claim 9, wherein the carbonate salt comprises sodium carbonate, sodium percarbonate, sodium bicarbonate, lithium carbonate, lithium percarbonate, lithium bicarbonate, potassium carbonate, potassium percarbonate, potassium bicarbonate, ammonium carbonate, sodium sesquicarbonate, potassium sesquicarbonate, ammonium bicarbonate, or a combination thereof.

12. The method of claim 9, wherein the gum comprises gum arabic, guar gum, xantham gum, sodium carboxymethylcellulose, or a combination thereof.

13. The method of claim 9, wherein the acid salt comprises sodium bisulfate, potassium bisulfate, ammonium bisulfate, or a combination thereof.

14. The method of claim 9, wherein the cleaning composition is free of surfactants.

15. A method of cleaning textile fibers soiled by oil particles, soil particles, or combinations thereof, comprising:
providing a cleaning composition comprising:
at least one acid in an amount of 25 percent to 70 percent of the cleaning composition by weight,
at least one carbonate salt in an amount of 25 percent to 70 percent of the cleaning composition by weight,
at least one gum in an amount of about 1 percent to 40 percent of the cleaning composition by weight, wherein the gum includes gum arabic, guar gum, xantham gum, or a combination thereof,
at least one acid salt, wherein the acid salt comprises sodium bisulfate, potassium bisulfate, ammonium bisulfate, or a combination thereof, and
at least one chelating agent in an amount of about 1 percent to 40 percent by weight,
wherein the cleaning composition includes less than 0.2 percent surfactant by weight;
dissolving the cleaning composition in water to form a liquid cleaner formula;
applying an amount of the liquid cleaner formula to one or more textile fibers, wherein the liquid cleaner formula removes at least a portion of the oil particles, soil particles, or combinations thereof from the textile fibers; and
removing at least a portion of the amount of the liquid cleaner formula from the one or more textile fibers.

16. The method of claim 15, wherein the cleaning composition includes less than 0.1 percent surfactant by weight of the cleaning composition.

17. The method of claim 15, wherein the carbonate salt comprises sodium carbonate, sodium percarbonate, sodium bicarbonate, lithium carbonate, lithium percarbonate, lithium bicarbonate, potassium carbonate, potassium percarbonate, potassium bicarbonate, ammonium carbonate, sodium sesquicarbonate, potassium sesquicarbonate, ammonium bicarbonate, or a combination thereof.

18. The method of claim 15, wherein the acid comprises adipic acid, fumaric acid, tartaric acid, oxalic acid, glutaric acid, tannic acid, lactic acid, citric acid, benzoic acid, or a combination thereof.

19. The method of claim 15, wherein the acid salt is present in an amount of about 1 percent to about 30 percent by weight of the cleaning composition.

20. The method of claim 15, wherein the gum is gum arabic.

* * * * *